UNITED STATES PATENT OFFICE.

KARL WILKE, OF HOCHST-ON-THE-MAIN, GERMANY, ASSIGNOR TO FARBWERKE VORM. MEISTER LUCIUS & BRÜNING, OF HOCHST-ON-THE-MAIN, GERMANY, A CORPORATION OF GERMANY.

ANTHRAQUINONE DERIVATIVES AND PROCESS OF MAKING SAME.

1,417,875.     Specification of Letters Patent.     Patented May 30, 1922.

No Drawing.     Application filed July 2, 1921. Serial No. 482,259.

*To all whom it may concern:*

Be it known that I, KARL WILKE, a citizen of Austria, residing at Hochst-on-the-Main, Unterliederbach, Germany, have invented certain new and useful Improvements in Anthraquinone Derivatives and Processes of Making Same, (for which I have made application in Germany, July 11, 1918, and March 11, 1920), of which the following is a specification.

According to "Berichte" Vol. XVI, page 698 H. Römer and W. Linck obtained a dyestuff soluble in alkalies with a violet coloration by causing hot concentrated sulfuric acid to act upon 1-nitro-2-methyl-anthraquinone.

Now I have found that the action of fuming sulfuric acid upon the 1-nitro-2-alkylanthraquinone has a quite different effect as products are thereby formed which are insoluble in alkalies and are distinguished by their great reactivity and constitute valuable starting material for the production of anthraquinone dyestuffs. Substitution products of the 1-nitro-2-alkylanthraquinone show an analogous behaviour. When operating under exclusion of air products of greater purity are obtained. Analysis of the thus produced bodies shows that there is one molecular proportion of water less than in the starting material used in every case. The elimination of water occurs between the nitro-and alkyl group with formation of hitherto unknown isoxazolederivatives of the anthraquinone.

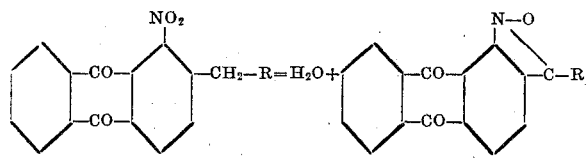

Examples.

(1) Action of fuming sulfuric acid upon the 1-nitro-2-methylanthraquinone:1.2.anthraquinone-isoxazol. An intimate mixture of one part of 1-nitro-2-methylanthraquinone and 20 parts of arenaceous quartz is made up by means of fuming sulfuric acid containing about 60% of anhydride into a stiff magma, this magma is introduced into ice, filtered off and washed with hot water. After having dried the residue the product of the reaction is freed from the sand by boiling it with xylene, from which solution it separates on cooling in form of a brownish yellow crystalline powder.

The body thus produced is difficultly soluble in the usual organic solvents, soluble in boiling xylene and melts, when quickly heated, at about 250° C. with decomposition. Its constitution corresponds with the empiric formula: $C_{15}H_7NO_3$.

(2) Action of fuming sulfuric acid upon the 1.5-dinitro-2-methylanthraquinone described in German Patent No. 131873:5-nitro-1.2-anthraquinoneisoxazole.

One part of 1.5-dinitro-2-methylanthraquinone is introduced, while cooling, into about 15 parts of fuming sulfuric acid containing 40% of anhydride. The product of the reaction is poured on ice, filtered off, washed, dried and recrystallized from chlorobenzene. It forms a greenish-yellow crystalline powder, difficultly soluble in the usual organic solvents, soluble in chlorobenzene, not fusible without decomposition and corresponding with the empiric formula: $C_{15}H_6N_2O_5$.

(3) Action of fuming sulfuric acid upon the 1-nitro-2-ethylanthraquinone as described in "Wiener Monatshefte," Vol. XXXII, page 624:1.2-anthraquinone-methylisoxazole.

The initial operation is identical with that mentioned in example (2). The product of the reaction is obtained from boiling xylene in the form of coarse, dark-brown crystals, melting at 210° but not sharply, and corresponding with the empiric formula: $C_{16}H_9NO_3$.

(4) Action of fuming sulfuric acid upon the 1-nitro-2-methyl-5.6.7.8-tetrachloranthraquinone:5.6.7.8-tetrachlor-1.2-anthraquinoneisoxazole:

There are first condensed according to the method of Friedel Craft tetrachlorphtalic anhydride and toluene so as to form p-methyl-tetrachlor-o-benzoylbenzoic acid which, when purified by forming the difficultly soluble sodium salt and recrystallized from benzene melts at 172° C.

The 2-methyl-5.6.7.8-tetrachloranthraquinone produced therefrom in the usual manner is obtained in the form of a pale greenish-yellow powder being insoluble in water difficultly soluble in alcohol, readily soluble in chloroform and melting at 192° C. In concentrated sulfuric acid it is difficultly soluble to a yellow solution.

On adding the calculated quantity of nitric acid or saltpetre ($KNO_3$) to the last-mentioned solution in concentrated sulfuric acid, there is readily produced the 1-nitro-2-methyl-5.6.7.8-tetrachloranthraquinone. This body which is very difficultly soluble in low-boiling solvents is obtainable by crystallization from much glacial acetic acid in the form of pale yellow crystalline aggregates which melt at 262° C. while first sintering and blackening.

One part of the 1-nitro-2-methyl-5.6.7.8-tetrachloranthraquinone thus obtained is introduced at 5–10° C. into 25 parts of fuming sulfuric acid containing about 60% of anhydride. From the solution which has a blood-red color, the reaction product is separated by pouring it on ice, it is then filtered, washed and dried. It constitutes a yellow powder with a green hue which is insoluble in water, very difficultly soluble in boiling alcohol, more readily soluble in benzene, chloroform, hot glacial acetic acid and solvents of a high boiling point. When crystallized from chlorobenzene, the body is obtained as yellow crystalline needles melting at 242° C. with decomposition. Its constitution may be expressed by the formula: $C_{15}H_3NO_3Cl_4$.

Having now described my invention, what I claim is:

1. As a new process, the manufacture of anthraquinone derivatives by causing fuming sulfuric acid to act upon 1-nitro-2-alkyl-anthraquinones.

2. As a new process, the manufacture of anthraquinone derivatives by causing fuming sulfuric acid to act upon 1-nitro-2-alkyl-anthraquinones under exclusion of air.

3. As new products, the bodies of the general formula:

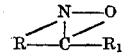

wherein "R" stands for an unsubstituted or in any way substituted anthraquinone residue and $R_1$ for hydrogen or an alkyl residue.

4. As new products anthraquinone derivatives insoluble in alkalies and having relatively great reactivity such as may be prepared by the hereindescribed process which comprises causing fuming sulfuric acid to act upon 1-nitro-2-alkyl-anthraquinones.

In testimony whereof, I affix my signature.

KARL WILKE.